(12) United States Patent
Ishitoya et al.

(10) Patent No.: US 9,217,539 B2
(45) Date of Patent: Dec. 22, 2015

(54) HIGH-PRESSURE TANK (75) Inventors: Tsukuo Ishitoya, Toyota (JP); Nobuo Kobayashi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 209 days.

(21) Appl. No.: 11/919,033

(22) PCT Filed: Jun. 1, 2006

(86) PCT No.: PCT/JP2006/311460
§ 371 (c)(1),
(2), (4) Date: Oct. 23, 2007

(87) PCT Pub. No.: WO2006/129878
PCT Pub. Date: Dec. 7, 2006

(65) Prior Publication Data
US 2009/0078706 A1 Mar. 26, 2009

(30) Foreign Application Priority Data

Jun. 1, 2005 (JP) .................................. 2005-161139

(51) Int. Cl.
*F17C 1/00* (2006.01)
*F17C 13/04* (2006.01)
(Continued)

(52) U.S. Cl.
CPC ................ *F17C 13/04* (2013.01); *B60K 15/07* (2013.01); *H01M 8/04216* (2013.01); *B60K 2015/0638* (2013.01); *F17C 2201/0109* (2013.01); *F17C 2201/035* (2013.01); *F17C 2201/056* (2013.01); *F17C 2203/0604* (2013.01); *F17C 2203/0619* (2013.01); *F17C 2203/0663* (2013.01); *F17C 2205/0305* (2013.01); *F17C 2205/0323* (2013.01); *F17C 2205/0326* (2013.01); *F17C 2205/0329* (2013.01); *F17C 2205/0338* (2013.01); *F17C 2205/0341* (2013.01); *F17C 2205/0391* (2013.01); *F17C 2205/0397* (2013.01); *F17C 2221/012* (2013.01); *F17C 2221/033* (2013.01); *F17C 2223/0123* (2013.01); *F17C 2223/036* (2013.01);
(Continued)

(58) Field of Classification Search
USPC ......... 220/581, 562, 582, 202, 203.1, 203.24, 220/203.28, 203.27, 203.29
See application file for complete search history.

(56) References Cited

U.S. PATENT DOCUMENTS 5,193,580 A * 3/1993 Wass et al. .................... 137/613
6,314,986 B1 * 11/2001 Zheng et al. .................. 137/240
(Continued)

FOREIGN PATENT DOCUMENTS

| JP | 58-111477 A | 7/1983 |
|---|---|---|
| JP | 58-195200 A | 12/1983 |

(Continued)

*Primary Examiner* — Jeffrey Allen
(74) *Attorney, Agent, or Firm* — Kenyon & Kenyon LLP (57) ABSTRACT

There is disclosed a high-pressure tank capable of appropriately discharging high-pressure gas. The high-pressure tank is mounted on a mobile body, stores the high-pressure gas, and includes a plurality of gas discharge means for discharging the high-pressure gas from the high-pressure tank. The gas discharge means are disposed at opposite sides of the high-pressure tank in a longitudinal direction. The gas discharge means can each have a path through which the inside of the high-pressure tank communicates with the outside thereof, and a manual valve including a manual operating section for opening and closing the path by a manual operation.

16 Claims, 4 Drawing Sheets (51) Int. Cl.
  *B60K 15/07* (2006.01)
  *H01M 8/04* (2006.01)
  *B60K 15/063* (2006.01)

(52) U.S. Cl.
  CPC .............. *F17C 2270/0105* (2013.01); *F17C 2270/0168* (2013.01); *F17C 2270/0189* (2013.01); *F17C 2270/05* (2013.01); *H01M 2250/20* (2013.01); *Y02E 60/321* (2013.01); *Y02E 60/50* (2013.01); *Y02T 90/32* (2013.01)

(56) References Cited

U.S. PATENT DOCUMENTS

2002/0117123 A1* 8/2002 Hussain et al. ............... 123/3
2003/0066836 A1* 4/2003 Sakaguchi et al. ............ 220/581

FOREIGN PATENT DOCUMENTS

| | | | |
|---|---|---|---|
| JP | 7-25259 | U | 5/1995 |
| JP | 9-290647 | A | 11/1997 |
| JP | 09-291862 | A | 11/1997 |
| JP | 10-281398 | A | 10/1998 |
| JP | 2601234 | Y2 | 9/1999 |
| JP | 2003-090499 | A | 3/2003 |
| JP | 2003-222300 | A | 8/2003 |
| JP | 2003-237389 | A | 8/2003 |
| JP | 2003-285655 | A | 10/2003 |
| JP | 2004-187485 | A | 7/2004 |
| JP | 2004-293571 | A | 10/2004 |

* cited by examiner

HIGH-PRESSURE TANK

This is a 371 national phase application of PCT/JP2006/311460 filed 1 Jun. 2006, claiming priority to Japanese Patent Application No. 2005-161139 filed 1 Jun. 2005, the contents of which are incorporated herein by reference.

TECHNICAL FIELD

The present invention relates to a high-pressure tank in which gas having a pressure increased as compared with a normal pressure is stored, and more particularly, it relates to a high-pressure tank to be mounted on a mobile body such as a vehicle.

BACKGROUND ART

As this type of high-pressure tank, for example, a tank is known which is mounted on a rear lower part of a vehicle body of a fuel cell vehicle (see JP 2004-187485 (FIG. 14)). A pipe is connected to only one end of this high-pressure tank in a longitudinal direction, and a manual valve is installed on this pipe.

DISCLOSURE OF THE INVENTION

However, in a conventional high-pressure tank, the manual valve is arranged at one portion. Therefore, when a vehicle structure around the high-pressure tank is largely deformed, an operation of the manual valve might be complicated. Therefore, even when gas is to be discharged from the high-pressure tank with the manual valve, the gas is not easily quickly discharged.

An object of the present invention is to provide a high-pressure tank capable of appropriately discharging high-pressure gas.

To solve the above problem, a high-pressure tank of the present invention is mounted on a mobile body, stores high-pressure gas, and has a plurality of gas discharge means for discharging the high-pressure gas from the high-pressure tank.

According to this constitution, even when the high-pressure gas is not easily discharged by one gas discharge means, the high-pressure gas can be discharged from another gas discharge means because the tank includes the plurality of gas discharge means. In consequence, for example, even when a structure of the mobile body around the high-pressure tank is largely deformed, the high-pressure gas can appropriately be discharged from the high-pressure tank without detaching the high-pressure tank from the mobile body.

Here, examples of the mobile body include a two-wheeled vehicle, vehicles such as a bus and a car having four or more wheels, a train, a ship, an airplane and a robot. Examples of the high-pressure gas include compressed natural gas and hydrogen gas.

According to one aspect of the present invention, it is preferable that each of the plurality of gas discharge means includes a path through which the inside of the high-pressure tank communicates with the outside thereof, and an on-off valve installed on the path.

With this constitution, the high-pressure gas can be discharged from the high-pressure tank via the path by opening the on-off valve.

Here, the on-off valve may be an electric driving valve or a man-powered valve. The man-powered valve may be a foot valve, but a manual valve described later is preferable.

According to one aspect of the present invention, it is preferable that the on-off valve is the manual valve having a manual operating section for opening and closing the path by a manual operation and that the manual operating section is arranged outside the high-pressure tank.

With this constitution, since the on-off valve is the manual valve, the on-off valve can be constituted to be compact. Since the manual operating section is arranged outside the high-pressure tank, the manual operating section can easily be accessed to operate the on-off valve.

Here, the manual operating section may be constituted of, for example, a handle, a lever, a button or the like.

In this case, it is preferable that the manual operating sections are disposed on at least opposite sides of the high-pressure tank in a longitudinal direction. From another viewpoint, it is preferable that two of the plurality of gas discharge means are disposed apart from each other via the center of the inside of the high-pressure tank.

With such a constitution, the manual operating sections are disposed so as to face each other in the high-pressure tank. In consequence, even when a part of the mobile body is largely deformed, the manual operating section comparatively little deformed on a side opposite to the largely deformed part can easily be accessed.

Moreover, it is preferable that the path is formed at a housing connected to the high-pressure tank. It is preferable that the housing is screwed into the high-pressure tank.

From another viewpoint of the present invention, in the aspect of the present invention, it is preferable that the high-pressure tank is formed into a substantially tightly closed cylindrical shape and that the plurality of gas discharge means are disposed at one end and the other end of the substantially tightly closed cylindrical shape of the high-pressure tank.

With this constitution, the plurality of gas discharge means can be disposed at the high-pressure tank in a state where the means are detached from each other as far as possible. In consequence, the plurality of gas discharge means are not arranged in the high-pressure tank in a concentrated manner. Therefore, even when the structure of the mobile body is deformed, for example, a possibility that the less deformed gas discharge means discharges the high-pressure gas can further increase. It is to be noted that the plurality of gas discharge means may be disposed on the opposite sides of the high-pressure tank in the longitudinal direction.

In this case, it is preferable that each of the plurality of gas discharge means has a path which is disposed at a connected body connected to the high-pressure tank and through which the inside of the high-pressure tank communicates with the outside thereof, and a manual valve disposed at the connected body and having a manual operating section for opening and closing the path by a manual operation. It is also preferable that the plurality of manual operating sections are arranged outside the high-pressure tank.

With this constitution, the gas discharge means can be disposed at the high-pressure tank by effectively using the connected body connected to the high-pressure tank. Since the manual operating sections are arranged outside the high-pressure tank, the manual operating section can easily be accessed.

In this case, it is preferable that at least one of the plurality of connected bodies is a valve assembly including a pressure regulation valve and/or a cut-off valve in addition to the manual valve.

This constitution can be useful in the mobile body in respect of an installation space of the high-pressure tank or arrangement of another device.

From another viewpoint of the present invention, in one aspect of the present invention, it is preferable that the mobile body is a vehicle and that the high-pressure tank is mounted on a vehicle body in a transverse direction.

With this constitution, the high-pressure tank is mounted in, for example, a valve width direction of a valve.

In this case, it is preferable that each of the plurality of gas discharge means includes a path through which the inside of the high-pressure tank communicates with the outside thereof, and a manual valve having a manual operating section which opens and closes the path by a manual operation. It is also preferable that two of the plurality of manual operating sections are opposed to spaces between a pair of side members of the vehicle body and the high-pressure tank.

With this constitution, since the manual operating sections are opposed to the spaces between the side members and the high-pressure tank, accessibility to the manual operating sections from the outside of the vehicle can be secured. When the side members are largely deformed, the manual operating sections capable of being opposed to a non-deformed or less deformed space can easily be accessed and operated with good operability.

In this case, it is preferable that the manual operating sections opposed to the spaces are arranged under the side members.

According to this constitution, the manual operating sections can be operated at least from the transverse direction without being hampered by the side members. In consequence, operation directivities of the manual operating sections can appropriately be secured.

In this case, it is preferable that the manual operating sections opposed to the spaces are arranged so as to be manually operated in at least the transverse direction and a vertical direction of the vehicle body.

According to one aspect of the present invention, it is preferable that the high-pressure tank is mounted on a rear lower part of the vehicle body or an upper part of the vehicle body.

With this constitution, in a comparatively large-sized vehicle such as a bus, the high-pressure tank may be mounted on the upper part of the vehicle body. In a comparatively small-sized vehicle which is smaller than the bus, when the high-pressure tank is mounted on the rear lower part of the vehicle body, a residential space in the vehicle is easily secured.

According to one aspect of the present invention, it is preferable that one of the plurality of manual valves normally closes and that another manual valve normally opens.

According to the high-pressure tank of the present invention described above, high-pressure gas stored in the tank can appropriately be discharged.

BEST MODE FOR CARRYING OUT THE INVENTION

A high-pressure tank according to a preferable embodiment of the present invention will hereinafter be described with reference to the accompanying drawings. This high-pressure tank is mounted on a mobile body such as a ship or an airplane. The high-pressure tank can appropriately discharge gas stored in the high-pressure tank, even when a structure of the mobile body around the high-pressure tank is largely deformed. Here, after a structure of the high-pressure tank is described, a four-wheeled vehicle will be described as the mobile body on which the high-pressure tank is to be mounted.

Figure 1:
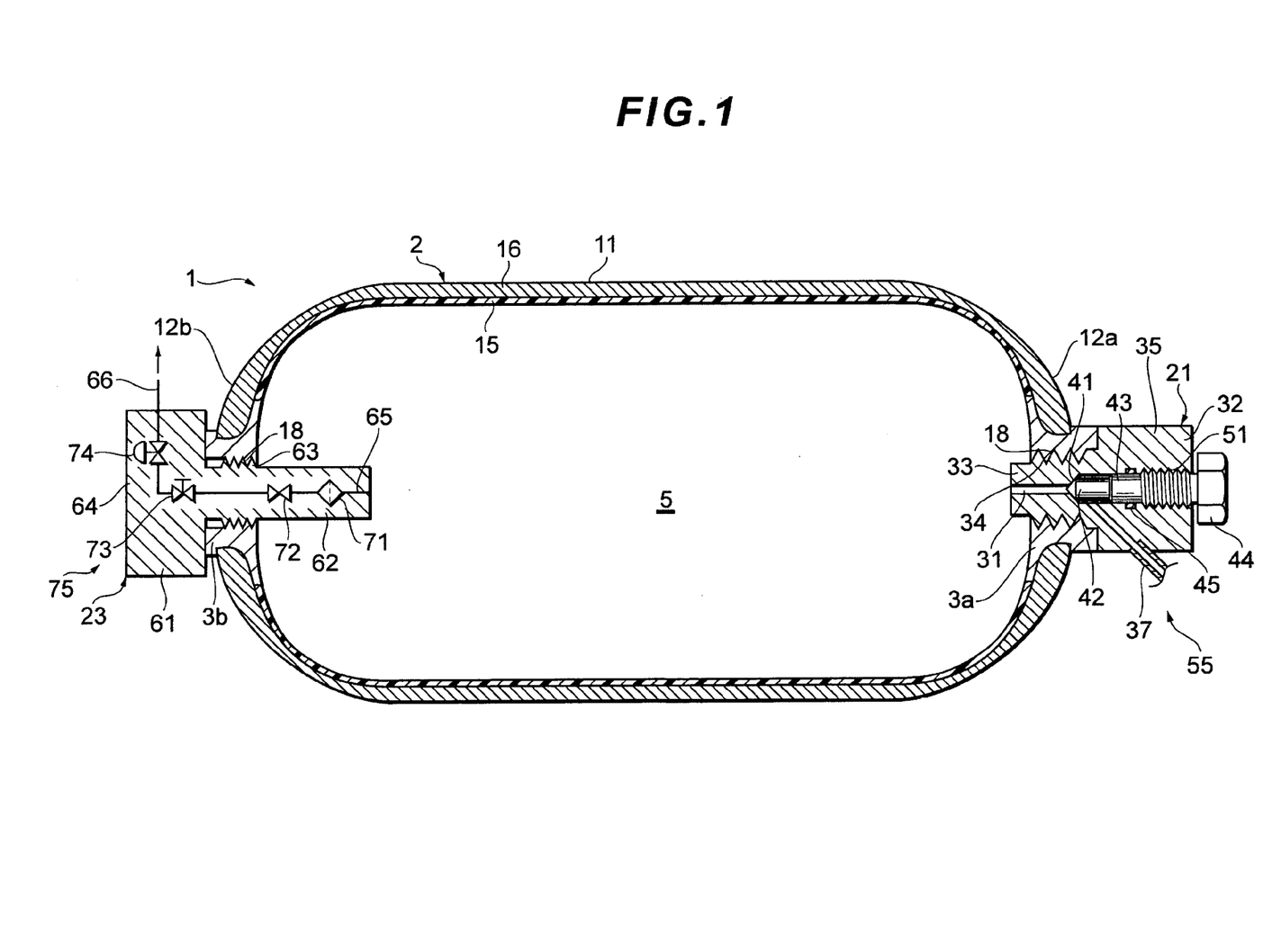
FIG. 1 is a sectional view showing a constitution of a high-pressure tank according to an embodiment.

As shown in FIG. 1, a high-pressure tank 1 which is a pressure container includes a tank main body 2 having a substantially tightly closed cylindrical shape as a whole and mouth pieces 3a, 3b attached to opposite end portions of the tank main body 2 in a longitudinal direction. The inside of the tank main body 2 is a storage space 5 in which various types of gases having pressures increased as compared with a normal pressure are stored. That is, the storage space 5 of the high-pressure tank 1 is constituted so that the high-pressure gas can be stored.

For example, in a fuel cell system, a pressure of a fuel gas prepared under a high pressure is reduced, so that the gas is used in power generation of a fuel cell. The high-pressure tank 1 of the present invention is applicable to storage of the high-pressure fuel gas, and hydrogen gas, compressed natural gas (CNG) or the like can be stored as the fuel gas. The hydrogen gas with which the high-pressure tank 1 is filled has a pressure of, for example, 35 MPa or 70 MPa, and the CNG has a pressure of, for example, 20 MPa. The high-pressure tank 1 in which the hydrogen gas is stored at a high pressure will hereinafter be described as one example.

The tank main body 2 includes a trunk part 11 having a substantially constant diameter in an axial direction, and a pair of end wall portions 12a, 12b each having a diameter reduced to be smaller than the trunk part 11. The tank main body 2 includes, for example, a double-layer structure, and the double-layer structure includes an inner liner 15 (an inner shell) having a gas barrier property and a reinforcement layer 16 (an outer shell) which covers an outer periphery of the liner 15. The liner 15 is constituted of, for example, a resin such as highly dense polyethylene or a metal such as an aluminum alloy. The reinforcement layer 16 is made of FRP including, for example, a carbon fiber and an epoxy resin.

The mouth pieces 3a, 3b are made of a metal such as stainless steel. Each of the mouth pieces 3a, 3b is disposed at the center of each of the end wall portions 12a, 12b each having a semispherical shape. An inner peripheral surface of an opening of each of the mouth pieces 3a, 3b is provided with an internal thread 18 into which any type of connected body is screwed.

Here, the connected body may be a pipe element such as a valve, a joint or a plug, or a component including a detection element such as a pressure sensor or a temperature sensor. The connected body may be a pipe itself, or a valve assembly as a module in which the pipe element and the detection element are integrally incorporated.

In the present embodiment, the connected body on the side of one mouthpiece 3a is composed of a manual valve 21, and the connected body on the side of the other mouthpiece 3b is composed of a valve assembly 23 including a manual valve 73.

The manual valve 21 has a housing 32 in which a gas discharge path 31 is formed. An outer peripheral surface of a neck portion 33 of the housing 32 is provided with an external thread 34 which engages with an internal thread 18 of the mouthpiece 3a, and the manual valve 21 can be screwed into the mouthpiece 3a via these thread portions. In the screwed state, a head portion 35 of the housing 32 is attached to an outer end surface of the mouthpiece 3a. In this state, a space between the housing 32 and the mouthpiece 3a is air-tightly sealed with a plurality of seal members (not shown).

The gas discharge path 31 is a path through which the inside of the high-pressure tank 1 communicates with the outside thereof. An upstream end of the path 31 opens in the storage space 5, and a downstream end of the path 31 is connected to a discharge pipe 37. The downstream end of the discharge pipe 37 may open to the atmosphere, or is connected to, for example, a pipe system or a constituting device in the fuel cell system. For example, the downstream end of the discharge pipe 37 is connected to a diluting device which reduces concentration of the hydrogen gas in the fuel cell system. It is to be noted that, although not shown, the discharge pipe 37 may be provided with a pressure reducing valve, and a pressure of the hydrogen gas to be discharged may be reduced with the pressure reducing valve. The discharge pipe 37 may extend and be arranged outside the vehicle.

The housing 32 has a valve functional portion of the manual valve 21 which opens and closes the gas discharge path 31. Specifically, the valve functional portion includes a valve body 42 which is detachably attached to a valve seat 41, a valve rod 43 having the valve body 42 at a tip end thereof, and a manual operating section 44 connected to a base end of the valve rod 43. An O-ring 45 for air-tightly sealing is disposed between an outer peripheral surface of an intermediate portion of the valve rod 43 and the head portion 35.

An axial direction of the valve rod 43 meets that of the high-pressure tank 1. An external thread 51 formed at the outer peripheral surface of a base end of the valve rod 43 engages with an internal thread formed at the inner peripheral surface of the head portion 35. When the manual operating section 44 is operated, the engaged valve rod 43 moves forward or backward, and the valve body 42 abuts on or comes away from the valve seat 41.

The manual operating section 44 is a section to be manually operated by a user or an operator, and disposed outside the tank main body 2. More specifically, the manual operating section 44 is positioned so as to protrude from an outer wall surface of the head portion 35. The manual operating section 44 is formed into a hexagonal nut shape, and constituted so as to be manually operated with a spanner or the like. It is to be noted that the shape of the manual operating section 44 is not limited to the hexagonal nut shape, and the section may be constituted of, for example, a circular handle to be rotatably operated, a lever or a push-pull operation type button.

When the manual operating section 44 is operated, the valve rod 43 advances in the axial direction, the valve body 42 abuts on the valve seat 41, and the gas discharge path 31 is then cut off. That is, the manual valve 21 is closed. On the other hand, when the manual operating section 44 is operated in reverse, the valve rod 43 retreats in the axial direction to detach the valve body 42 from the valve seat 41, and the gas discharge path 31 is then opened. That is, the manual valve 21 is opened, and the hydrogen gas is discharged from the high-pressure tank 1 through the gas discharge path 31 to the discharge pipe 37.

In this manner, the manual valve 21 and the gas discharge path 31 function as first gas discharge means (a gas discharge structure) which discharges the hydrogen gas from the high-pressure tank 1. At a normal time (a use time) of the high-pressure tank 1, the manual valve 21 is closed. Moreover, the manual valve 21 is opened mainly at an emergency time when the hydrogen gas cannot be discharged from the side of the valve assembly 23.

The valve assembly 23 has a housing 61 disposed so as to extend in and out of the high-pressure tank 1. When an external thread 63 formed at an outer peripheral surface of a neck portion 62 of the housing 61 engages with the internal thread 18 of the mouthpiece 3b, the valve assembly 23 can be screwed into the mouthpiece 3b. In the screwed state, a head portion 64 of the housing 61 is attached to an outer end surface of the mouthpiece 3b. In this state, a space between the housing 61 and the mouthpiece 3b is air-tightly sealed with a plurality of seal members (not shown).

In the housing 61, a gas path 65 is disposed through which the inside of the high-pressure tank 1 communicates with the outside thereof. One end of the gas path 65 opens in the storage space 5, and the other end thereof is connected to an external gas discharge line 66. For example, the high-pressure tank 1 in the fuel cell system discharges the hydrogen gas from the storage space 5 to the gas discharge line 66 via the gas path 65. Moreover, the hydrogen gas is supplied to the fuel cell disposed at the gas discharge line 66.

The gas path 65 is provided with, in order from the side of the storage space 5, a filter 71 which traps foreign matters included in the hydrogen gas, a cut-off valve 72 which can electrically open/close the gas path 65, the manual valve 73 which can open/close the gas path 65 by the manual operation, and a pressure regulation valve 74 which reduces a pressure of the gas to regulate the pressure. These three valves are arranged in series in the gas path 65. The cut-off valve 72 functions as a source valve of the high-pressure tank 1, and is positioned, for example, inside the tank main body 2.

As shown in a circuit diagram of FIG. 1, the manual valve 73 has a valve functional portion which opens and closes the gas path 65 in the same manner as in the above manual valve 21. That is, the manual valve 73 has a manual operating section to be manually operated by the user or the operator, and the manual operating section is positioned outside the tank main body 2 so as to protrude from an outer wall surface of the housing 61. Moreover, when the manual operating section is operated, a valve body comes away from or comes in contact with a valve seat, and the manual valve 73 opens and closes the gas path 65. In this manner, the manual valve 73 and the gas path 65 function as second gas discharge means 75 (a gas discharge structure) disposed at Therefore, high-pressure tank 1. The manual valve 73 normally opens.

Figure 3:
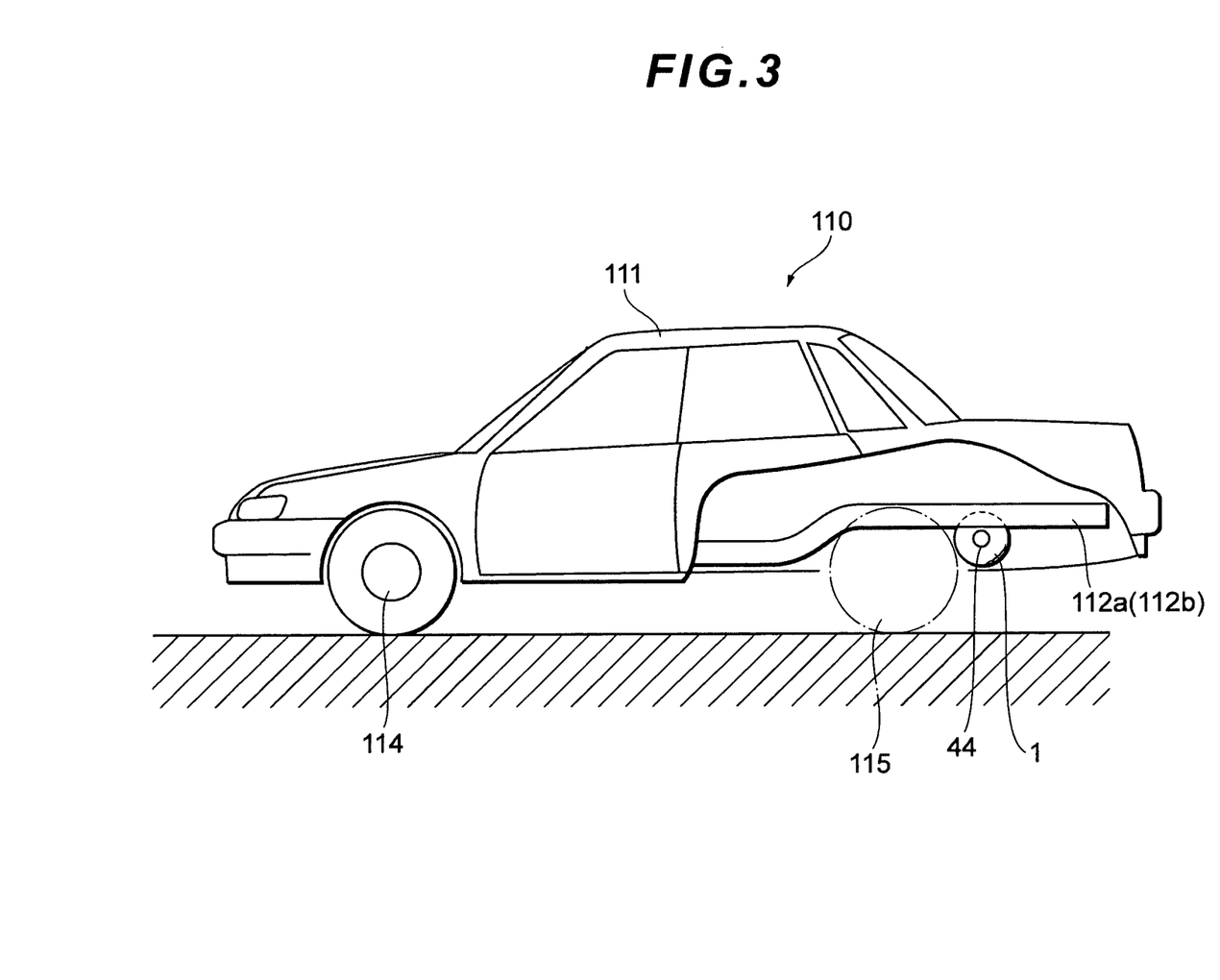
FIG. 3 is a side view schematically showing a state in which the high-pressure tank according to the embodiment is mounted on a vehicle.
Figure 4:
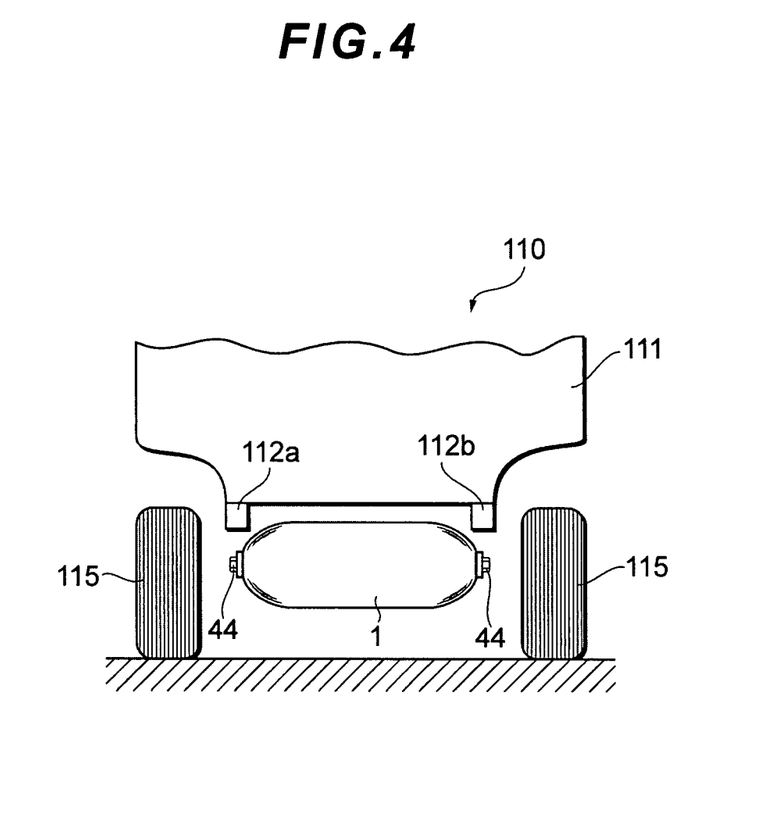
FIG. 4 is a rear view schematically showing a state in which the high-pressure tank according to the embodiment is mounted on the vehicle.

The manual operating section of the manual valve 73 may be constituted of the hexagonal nut, the circular handle to be rotatably operated, the lever or the push-pull operation type button. In FIGS. 3 and 4 described later, the manual operating section of the manual valve 73 is formed into a hexagonal nut shape in the same manner as in the manual operating section 44 of the manual valve 21. Two manual operating sections in the high-pressure tank 1 are positioned at opposite ends of the high-pressure tank 1 in the longitudinal direction.

It is to be noted that the manual valve may be disposed at another path. For example, when the valve assembly 23 is installed on another path such as a gas filling path or a gas relief path, the path may be provided with the manual valve. This path and the manual valve disposed at the path function as third gas discharge means (a gas discharge structure) disposed at the high-pressure tank 1. A manual valve of the third gas discharge means may be normally closed, and opened at an emergency time when any hydrogen gas cannot be discharged from the gas path 65 in the same manner as in the manual valve 21.

Figure 2:
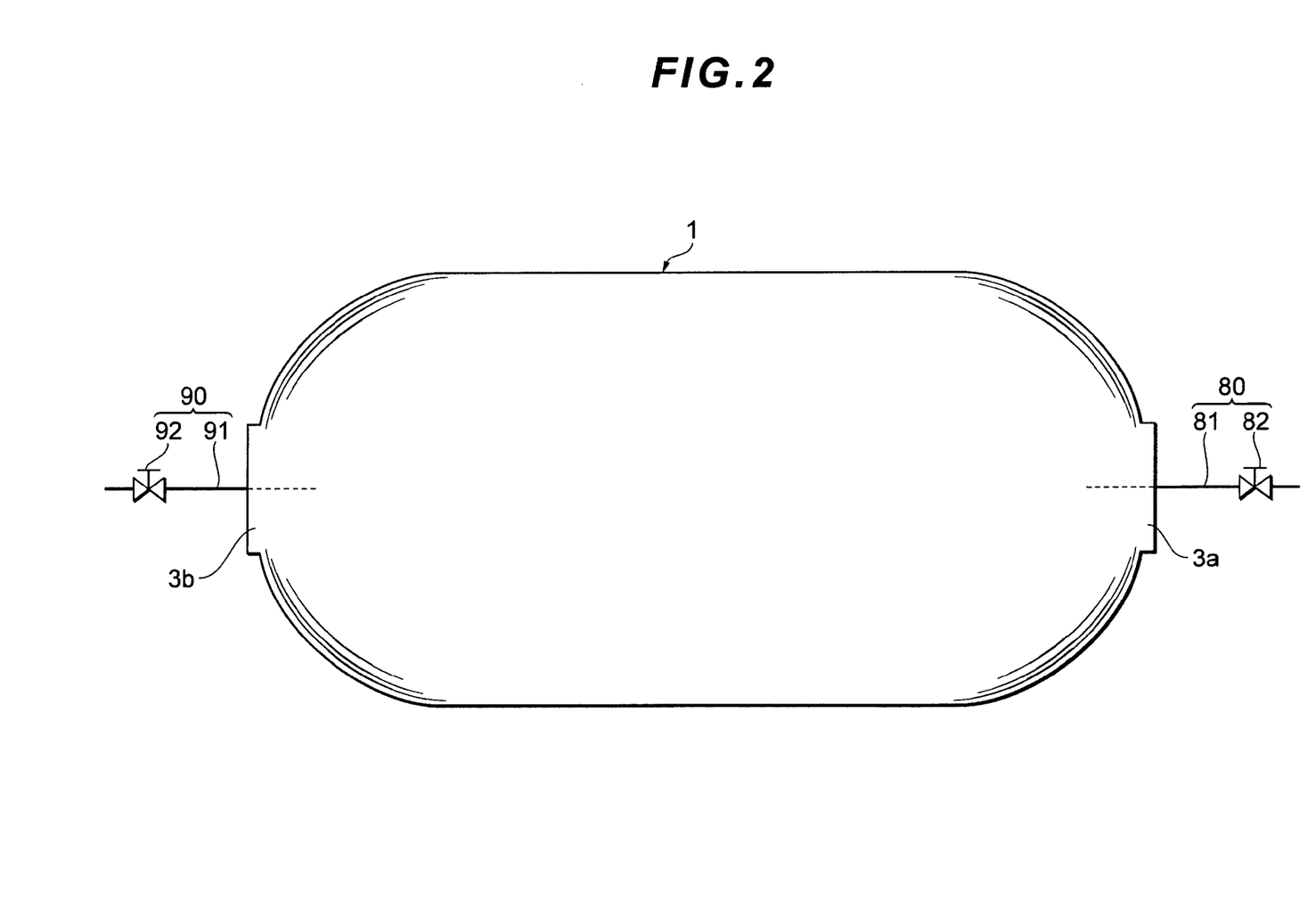
FIG. 2 is a front view schematically showing a constitution of a high-pressure tank according to another embodiment.

FIG. 2 is a diagram showing another example of the high-pressure tank 1. A plurality of gas discharge means 80, 90 (gas discharge structures) are disposed on opposite sides of the high-pressure tank 1 in the longitudinal direction. In this case, the first gas discharge means 80 includes a pipe 81 connected to the mouthpiece 3a and a manual valve 82 which opens and closes a path disposed in the pipe 81. Similarly, the second gas discharge means 90 includes a pipe 91 connected to the mouthpiece 3b and a manual valve 92 which opens and closes a path disposed in the pipe 91.

A case where the plurality of gas discharge means 80, 90 are disposed at the high-pressure tank 1 in this configuration is included in the scope of the present invention. A combination of the configuration of the gas discharge means (80, 90) shown in FIG. 2 and the configuration of the gas discharge means (55, 75) shown in FIG. 1 is included in the scope of the high-pressure tank 1 of the present invention.

FIG. 3 is a schematic side view showing that the high-pressure tank 1 is mounted on a fuel cell car 110. FIG. 4 is a schematic rear view showing that the high-pressure tank 1 is mounted on the fuel cell car 110. In both of the drawings, the high-pressure tank 1 shown in FIG. 1 is simplified and shown. It is to be noted that in the following description with reference to FIG. 4, in the same manner as in the manual operating section 44 of the manual valve 21, a manual operating section on the side of the valve assembly 23 is denoted with reference numeral 44.

In the passenger car type vehicle 110, the high-pressure tank 1 is mounted and fixed to a rear part of a vehicle body 111. The vehicle body 111 has a body frame, and the body frame has a pair of side members 112a, 112b constituted of a pipe material arranged at a lower part of the vehicle body 111. The pair of side members 112a, 112b are arranged with a space therebetween in a vehicle transverse direction, and extend in a longitudinal direction of the vehicle. Front wheels 114 and rear wheels 115 are arranged outside the left and right sides of the pair of side members 112a, 112b, respectively.

It is to be noted that, although not shown, in a front part of the vehicle body 111, various constituting devices (e.g., a fuel cell) in a fuel cell system, a motor which generates an impulsive force of the vehicle 110 owing to a power generated by the fuel cell, a power control unit which generally controls the vehicle 110 and the like are arranged. The vehicle 110 functions as the fuel cell car.

The high-pressure tank 1 is mounted with a laterally directed horizontal posture on the rear lower part of the vehicle body 111 so that the longitudinal direction of the tank agrees with the transverse direction of the vehicle. When the high-pressure tank 1 is mounted on this position, a vehicle passenger room can be inhibited from being reduced, and a residential property is easily secured. In a case where a plurality of high-pressure tanks 1 are mounted on the vehicle, the laterally directed high-pressure tanks 1 may be arranged in parallel in the longitudinal direction of the vehicle. For example, two high-pressure tanks 1 integrated into a module may be arranged before and after the rear wheel 115, respectively.

The high-pressure tank 1 is positioned between the pair of side members 112a, 112b, and fixed to a body frame via brackets (not shown). It is to be noted that the high-pressure tank 1 may be mounted on a base, and the high-pressure tank 1 or the base may be fixed to the body frame with an appropriate connecting member. In a state in which the high-pressure tank 1 is mounted, the manual valve 21 and the valve assembly 23 are positioned under each of the side members 112a, 112b, respectively.

More specifically, the manual operating section 44 of the manual valve 21 is opposed to a lower space between the side member 112a and the high-pressure tank 1, and the manual operating section 44 of the manual valve 73 on the side of the valve assembly 23 is opposed to a lower space between the side member 112b and the high-pressure tank 1. The manual operating sections 44, 44 are positioned right under the side members 112a, 112b or under the vehicle inwardly from the side members, and are arranged with a predetermined gas from each of the rear wheels 115, 115 in the transverse direction of the vehicle. Each manual operating section 44 is arranged at a position displaced from an axial line of a rotary shaft of the rear wheel 115.

As described above, two manual operating sections 44, 44 are arranged in consideration of a shape of the vehicle 110 at a time when the high-pressure tank is mounted on the vehicle, and the manual operating sections 44, 44 are exposed in arrangement spaces between the side members 112a, 112b and the high-pressure tank 1. In consequence, interference between each manual operating section 44 and a structure on the side of the vehicle 110 can be suppressed. Moreover, each manual operating section 44 can appropriately manually be operated from the outside of the vehicle body 111. For example, the manual operating sections 44 can manually be operated outside the vehicle in the transverse direction, the manual operating sections 44 can manually be operated from the vertical direction of the vehicle, and the manual operating sections 44 can further manually be operated from behind the vehicle. It is to be noted that, when the high-pressure tank 1 is covered with a housing or the like and mounted on the vehicle 110 in consideration of deformation of a skeletal frame of the vehicle and the like, two manual operating sections 44 may be exposed outside the housing.

As described above, in the high-pressure tank 1 to be mounted on the vehicle according to the present embodiment, two gas discharge means (55, 75) are disposed so as to face each other. Therefore, even when the vehicle 110 is largely deformed, the hydrogen gas can be discharged from the high-pressure tank 1 with good operability.

For example, when a side surface of the vehicle 110 is largely deformed, the manual valve (one of 21 and 73) close to this side surface is not easily accessed from the outside of the vehicle. However, since a side surface of the vehicle on a side opposite to the deformed surface is little or never deformed, a state in which the manual valve (the other of 21 and 73) on this side is easily accessed from the outside of the vehicle is maintained.

Therefore, when the vehicle 110 is largely deformed at the emergency time and accordingly recovered, the manual operating section 44 of the accessible manual valve can manually be operated without performing any operation of detaching the high-pressure tank 1 from the vehicle body 111 or the like. In consequence, the hydrogen gas can appropriately be discharged from the high-pressure tank 1 with good operability. That is, when the high-pressure tank 1 is provided with two discharge means (55, 75) disposed away from each other, fail-safe can be achieved.

<Modification>

Next, another high-pressure tank 1 of the present invention will be described.

A position of the high-pressure tank 1 mounted on a vehicle is not only a rear part of a vehicle body 111 but also a front part or a part under a floor of the vehicle body 111. Needless to say, the high-pressure tank 1 may be mounted under a driver's seat. In a case where a vehicle 110 is a bus larger than a passenger car, the high-pressure tank 1 may be mounted and fixed to a front portion or the center of an upper part of the vehicle. Even in this case, a plurality of high-pressure tanks 1 may be disposed. The high-pressure tank 1 may be mounted and fixed with a vertically disposed horizontal posture on the vehicle body 111 so that a longitudinal direction of the tank agrees with a longitudinal direction of the vehicle 110.

When the plurality of high-pressure tanks 1 are laterally or vertically mounted on the vehicle, each of the plurality of high-pressure tanks 1 may be provided with two manual valves. Alternatively, for example, a common pipe which connects the plurality of high-pressure tanks 1 to each other may be disposed, and the manual valve may be installed on this common pipe. In any modification, the plurality of gas discharge means may be disposed on different sides so that the means are scattered in the high-pressure tank 1. A valve for the gas discharge means is constituted of a manual valve 21 (73), but the valve for the gas discharge means may be constituted of another man-powered valve such as a foot valve.

Furthermore, the present invention does not exclude a case where the valve for the gas discharge means is constituted of an electric driving valve. Examples of the electric driving valve include an electromagnetic valve to be driven by a solenoid, an electric valve to be driven by a motor and a valve to be driven by an electric or magnetic force of a piezoelectric element or a magnetostrictive element. When a skeletal frame of the vehicle is deformed, the electric driving valve may forcibly operated from the outside to discharge hydrogen gas from the high-pressure tank 1, or the electric driving valve may electrically be driven to discharge the hydrogen gas. The valve for the gas discharge means may be constituted of a fusible plug valve.

INDUSTRIAL APPLICABILITY

A high-pressure tank 1 described above is preferably applicable to not only a vehicle 110 on which a fuel cell system is mounted but also another mobile body other than the vehicle, for example, an airplane, a ship, a robot and the like.

The invention claimed is:

1. A high-pressure tank which is mounted on a mobile body and in which high-pressure gas is stored, the tank comprising:
a plurality of mouthpieces; and
a plurality of gas discharge means for discharging the high-pressure gas from the high-pressure tank,
wherein each of the plurality of gas discharge means is respectively connected to each of the plurality of mouthpieces,
wherein each of the plurality of gas discharge means includes a path through which the inside of the high-pressure tank communicates with the outside thereof,
wherein each of the plurality of gas discharge means includes an on-off valve which is a man-powered valve and which opens and closes the path,
wherein each on-off valve has a manual operating section for opening and closing the path, and the manual operating section is arranged outside the high-pressure tank,
wherein the high-pressure tank is formed into a substantially tightly closed cylindrical shape, and the plurality of gas discharge means are disposed at one end and the other end of the substantially tightly closed cylindrical shape of the high-pressure tank,
wherein at least one of the plurality of gas discharge means includes a pressure regulation valve, the pressure regulation valve and the on-off valve being disposed outside the high-pressure tank and connected in series such that the on-off valve is disposed closer to the inside of the high pressure tank,
wherein a head portion of the at least one of the plurality of gas discharge means is outside of the high-pressure tank and in direct contact with an outer end surface of the corresponding mouthpiece, and
wherein the head portion of the at least one of the plurality of gas discharge means includes both the pressure regulation valve and the on-off valve.

2. The high-pressure tank according to claim 1, wherein the path is formed at a housing connected to the high-pressure tank.

3. The high-pressure tank according to claim 2, wherein the housing is screwed into the high-pressure tank.

4. The high-pressure tank according to claim 1, wherein two of the plurality of gas discharge means are disposed apart from each other via the center of the inside of the high-pressure tank.

5. The high-pressure tank according to claim 1, wherein the path, the pressure regulation valve, and the on-off valve are disposed at a connected body connected to the high-pressure tank.

6. The high-pressure tank according to claim 5, wherein the connected body is a valve assembly including a cut-off valve in addition to the pressure regulation valve and the on-off valve.

7. The high-pressure tank according to claim 1, wherein
the mobile body is a vehicle, and
the high-pressure tank is mounted on a vehicle body in a transverse direction.

8. The high-pressure tank according to claim 7,
wherein the on-off valve of each of the plurality of gas discharge means is a manual valve having a manual operating section for opening and closing the path by a manual operation, and
wherein the plurality of gas discharge means is two gas discharge means and the manual operating sections of the two gas discharge means are each opposed to spaces between a pair of side members of the vehicle body and the high-pressure tank.

9. The high-pressure tank according to claim 8, wherein the manual operating sections opposed to the spaces are arranged under the side members.

10. The high-pressure tank according to claim 8, wherein the manual operating sections opposed to the spaces are arranged so as to be manually operated in at least the transverse direction and a vertical direction of the vehicle body.

11. The high-pressure tank according to claim 7, wherein the high-pressure tank is mounted on a rear lower part of the vehicle body or an upper part of the vehicle body.

12. The high-pressure tank according to claim 7, wherein the path is formed at a housing connected to the high-pressure tank.

13. The high-pressure tank according to claim 7, wherein one of the on-off valves of the plurality of gas discharge means is normally closed and another on-off valve of the plurality of gas discharge means is normally open.

14. The high-pressure tank according to claim 1, wherein the high-pressure gas is hydrogen gas.

15. The high-pressure tank according to claim 1, wherein the high-pressure gas is compressed natural gas.

16. The high-pressure tank according to claim 9, wherein the manual operating sections opposed to the spaces are arranged so as to be manually operated in at least the transverse direction and a vertical direction of the vehicle body.

* * * * *